United States Patent
Khoo

(10) Patent No.: US 7,366,552 B2
(45) Date of Patent: *Apr. 29, 2008

(54) COMPOUND PORTABLE COMPUTING DEVICE WITH DUAL PORTION VARIABLE KEYBOARDS COUPLED OVER A WIRELESS LINK

(75) Inventor: Soon Huat Khoo, Alameda, CA (US)

(73) Assignee: Wireless 3G, Alameda, CA (US)

( * ) Notice: Subject to any disclaimer, the term of this patent is extended or adjusted under 35 U.S.C. 154(b) by 94 days.

This patent is subject to a terminal disclaimer.

(21) Appl. No.: 11/043,789

(22) Filed: Jan. 25, 2005

(65) Prior Publication Data

US 2005/0208983 A1    Sep. 22, 2005

Related U.S. Application Data

(63) Continuation-in-part of application No. 10/167,251, filed on Jun. 10, 2002, now Pat. No. 6,867,965.

(51) Int. Cl.
*G09G 5/00* (2006.01)
*H04M 1/00* (2006.01)

(52) U.S. Cl. .................... 455/575.1; 455/550.1

(58) Field of Classification Search .......... 455/556.1, 455/556.2, 557, 66.1, 69, 11.1, 554; 361/681, 361/686; 705/57; 345/168, 169
See application file for complete search history.

(56) References Cited

U.S. PATENT DOCUMENTS

| | | | |
|---|---|---|---|
| 4,853,888 A | | 8/1989 | Lata et al. |
| 6,011,495 A | | 1/2000 | Chen |
| 6,046,731 A | * | 4/2000 | Griffin et al. ............... 345/168 |
| 6,081,207 A | * | 6/2000 | Batio ........................... 341/20 |
| 6,088,220 A | * | 7/2000 | Katz ........................... 361/680 |
| 6,429,793 B1 | | 8/2002 | Paolini |
| 6,630,924 B1 | * | 10/2003 | Peck .......................... 345/168 |
| 6,882,859 B1 | | 4/2005 | Rao et al. |
| 2002/0118175 A1 | * | 8/2002 | Liebenow et al. .......... 345/168 |

\* cited by examiner

*Primary Examiner*—George Eng
*Assistant Examiner*—Sam Bhattacharya
(74) *Attorney, Agent, or Firm*—Courtney Staniford & Gregory LLP

(57) ABSTRACT

A compound portable computing device comprising two or more separate portable devices coupled over a wireless link is described. A first portable computing device contains a first portion of a full-size keyboard, such as a standard QWERTY keyboard or foreign language keyboard. A second portable computing device contains a second portion of the full-size keyboard, and the first portion and the second portion together comprise the keys of the full-size keyboard. A network link is established that couples the first portable computing device to the second portable computing device. A partial keyboard map is loaded into memory of the first and second devices. The partial keyboard map loaded into the memory of the first device corresponds to the portion of the keyboard contained in the first device, and the partial keyboard map loaded into the memory of the second device corresponds to the portion of the keyboard contained in the second device. The partial keyboard maps are operable to allow the first and second portable computing devices to operate in conjunction with each other to provide text input using the first and second portions of the full-size keyboard.

6 Claims, 13 Drawing Sheets

| Q | W | E | R | * |
|---|---|---|---|---|
| 1 | 2 | 3 |   |   |
| A | S | D | F | # |
| 4 | 5 | 6 |   |   |
| Z | X | C | V |   |
| 7 | 8 | 9 |   | 0 |

302

| T | Y | U | I | O | P |
|---|---|---|---|---|---|
| G | H | J | K | L | . |
| B | N | M | ? | SPACE | |

| T | Y : | U | I | O | P |
|---|---|---|---|---|---|
| - | @ | # | * | + | - |
| G | H | J | K | L ENTER |
| = | \ | / | ← | → |
| V | B | N | M | SPACE |
| ↓ | ↑ | ? | . | BACKSPACE |

*310*

| Z | Q | W abc 2 | E def 3 | R ghi 4 |
|---|---|---|---|---|
| | 1 | | | |
| | A jkl 5 | S mno 6 | D pqrs 7 | F tuv 8 |
| | SHIFT * + | DELETE # CAPSLK | X wxz 9 | C oo 0 |

COMPOUND PORTABLE COMPUTING DEVICE WITH DUAL PORTION VARIABLE KEYBOARDS COUPLED OVER A WIRELESS LINK

CROSS-REFERENCE TO RELATED APPLICATIONS

The present application is a Continuation-in-Part application of currently pending patent application Ser. No. 10/167,251, filed on Jun. 10, 2002 now U.S. Pat. No. 6,867,965 and entitled Compound Portable Computing Device With Dual Portion Keyboard Coupled Over a Wireless Link, which is assigned to the assignees of the present application.

FIELD OF THE INVENTION

The present invention relates generally to portable computing devices, and more specifically, to portable computing devices comprising dual-portion keyboards of various configurations for data entry.

BACKGROUND OF INVENTION

The proliferation of compact personal computing devices, such as Personal Digital Assistants (PDA's), mobile phones, and miniature notebook computers has led to a great deal of variation with regard to keyboard design and layout, as well as data input functions. For handheld devices that feature full text input capability, most manufacturers have tried to facilitate the traditional QWERTY layout for their keypads in order to maintain a correspondence with familiar computer and typewriter keyboards.

Although their small size facilitates convenience and portability, present portable computing devices typically present significant disadvantages associated with text-based data input. Many new designs provide individual keys for different letters and numerals. However, fitting all of the keys necessary to accommodate the letters, numerals, punctuation, and function buttons on a space limited roughly to the size of a person's hand, requires that keys be made very small. This greatly hinders the convenience and usability of such keyboards, as it is nearly impossible to type quickly and accurately with such small buttons. As an alternative, some designs feature double or triple keystroke combinations to form certain characters. This allows for some of the keys to be eliminated, and the remaining keys to be enlarged, to the extent that space permits. However, this design is also inconvenient and somewhat clumsy due to the fact that new keystroke techniques must be learned, and double or triple tapping can further limit typing speeds. Furthermore, the reduction in the number of keys often does not allow a significant increase in the size of the remaining keys to a size that allows easy data entry. It is therefore desirable to provide a portable device keyboard system that provides the ergonomic efficiency of a traditional QWERTY keyboard, but that features near full-size keys for easy data entry.

Present trends in PDA design are moving toward greater integration of features within individual devices. Advanced PDA devices and mobile phones feature various integrated functions, such as cell phone capability, two-way radio communication, word processing, data storage, electronic mail (e-mail), web browsing, and other such functions, all in a single hand-held device. Such highly integrated devices have some appeal among the segment of users who value having access to a full range of mobile functionality, yet insist on carrying a minimum number of different devices. However, there are many users who do not mind carrying separate devices, and in fact may prefer to carry a cell phone as well as a separate PDA-type device. Because of the space constraints discussed above, highly integrated, "all-in-one" devices are often complex, hard to use, and non-optimized for specific functions. When used as a mobile phone, typical PDA devices are too large. Conversely, present cell phone form-factors are too small to be useful as full function PDA devices. For this reason, it is also often desirable to carry separate mobile phone and PDA devices. This allows each device to be used in the manner in which its design is optimized.

Because manufacturers have typically been more concerned with integrating functions in a single device, little development has been devoted to integrating the functionality of mobile phones and PDA devices as separate but cooperative devices. However, these devices share common elements, such as display screens, keypads, speakers, and microphones, that can be used together to form a single networked device. Such cooperative networking can result in a compound device that provides a higher degree of usability and convenience than the two devices provide separately. In this manner, the two devices can be virtually integrated into a single unitary device, to provide a greater ease of use than a single highly integrated device. Therefore, it is also desirable to provide a system of networking a mobile telephone type device and a PDA type device to produce a portable networked device that combines the features of both devices while allowing both to be used independently from one another.

Keyboards for data entry have increasingly become adapted for use in foreign markets. Such keyboards allow for data entry in different languages and are often based on the traditional QWERTY layout. Some variations are often present, however, to improve usability in those particular languages. For example, European keyboards may reorder the layout of the letters to accommodate the unique structure of the alphabets used in the various countries of Europe, and keyboards used in Asian countries may map different characters or symbols to the standard 105 key layout. In addition, the layout of keyboards for the U.S. market have started to vary from the traditional QWERTY layout to offer different layouts to facilitate ergonomic, speed, or similar considerations.

It is therefore desirable to provide a portable device keyboard system that maps the keyboard layout of alternative or foreign keyboards to the data entry system of the portable device and also provides near full-size keys for easy data entry.

SUMMARY OF THE INVENTION

A compound portable computing device comprising two or more separate portable devices coupled over a wireless link is described. A first portable computing device contains a portion of a standard QWERTY keyboard or other type of keyboard for text entry. A second portable computing device contains the remaining portion of the keyboard. The first and second devices are coupled over a wireless link. A partial keyboard map is loaded into memory of the first and second devices. The partial keyboard map loaded into the memory of the first device corresponds to the portion of the keyboard contained in the first device, and the partial keyboard map loaded into the memory of the second device corresponds to the portion of the keyboard contained in the second device. The first and second devices establish communication over the wireless link. The partial keyboard maps link the keypads of both devices such that when used together, the two keyboard portions form a full QWERTY keyboard or other type of keyboard.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which:

FIG. 3A illustrates the layout of a dual portion keyboard, according to one embodiment of the present invention;

FIG. 3C illustrates the layout of a dual portion keyboard, according to a second alternative embodiment of the present invention;

DETAIL DESCRIPTION OF INVENTION

A dual portion portable computing device keyboard with a wireless link is described. In the following description, for purposes of explanation, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of preferred embodiments is not intended to limit the scope of the claims appended hereto.

Aspects of the present invention may be implemented on one or more portable computing devices executing software instructions. The portable computing devices may be preprogrammed stand-alone devices, or they may be networked to other computers or computing devices in a client/server network. According to one embodiment of the present invention, such a server and client computer system can transfer data over a computer network, standard telephone line, or wireless data link. The steps of accessing, downloading, and manipulating the data, as well as other aspects of the present invention are implemented by central processing units (CPU) in server and portable device client computers executing sequences of instructions stored in a memory. The memory may be a random access memory (RAM), read-only memory (ROM), a persistent storage, such as a mass storage device, or any combination of these devices. Execution of the sequences of instructions causes the CPU to perform steps according to embodiments of the present invention.

Figure 1:
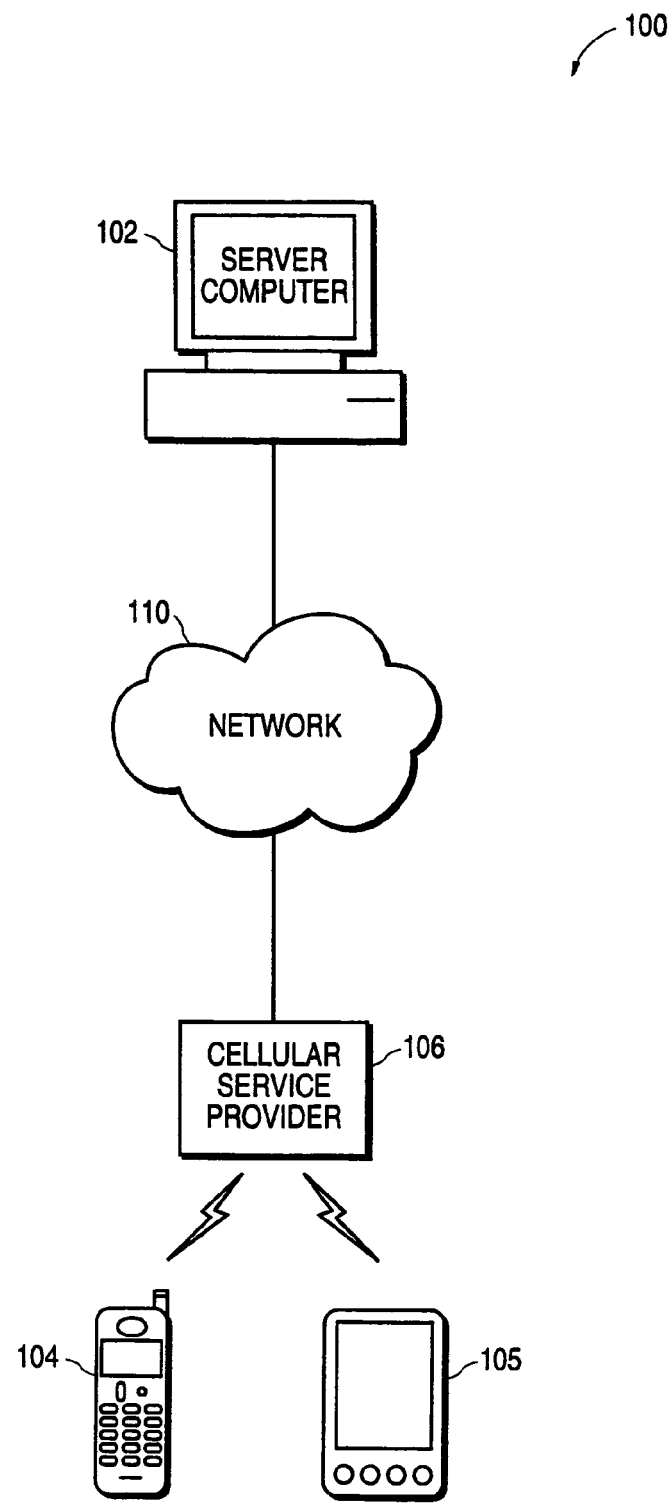
FIG. 1 illustrates a block diagram of a computer network system that implements embodiments of the present invention.

FIG. 1 illustrates a client server computer network that can be used to implement embodiments of the present invention. In network 100, server computer 102 is coupled to the one or more remote client computing devices 104 and 105 over a network 110. Network 110 may be a Local Area Network (LAN), Wide Area Network (WAN), telecommunications network, the Internet, or any similar type of network for coupling a plurality of computing devices to one another.

Server 102 transmits and receives digital data over network 110 from the one or more portable computing devices 104 and 105. Such data may be video data, audio data, text data, or any combination thereof. The portable computing devices are generally hand-held, personal digital assistant ("PDA") devices 105, cell phones 104, data-enabled telephones ("SmartPhone"), or some other type of portable, hand-held network access device. Such devices may be coupled to network 110 over a wireless link. Popular PDA devices 104 that can be used with embodiments of the present invention include PALM O/S™ devices such as the PALM PILOT™, and WINDOWS CE™ devices such as PDA devices made by Casio, Hewlett-Packard, and Philips Corp. Similarly, an example of a SmartPhone 106 that can be used is the Qualcomm™ PdQ phone, which is a cellular phone with digital computing and display capabilities. The portable client computing devices 104 and 105 may be Internet-enabled devices that connect to the Internet using their own internal Internet browsing abilities, such as a web browser on a hand-held computer or PDA device. Other remote devices may be Wireless Application Protocol (WAP) devices that include built-in browser capabilities.

For portable client computing devices 104 and 105 that access network 110 over a cellular telecommunications link, network 110 includes an interface to a cellular network through a cellular service provider 106. Such a cellular network typically includes server computers for the service carriers and the cell sites that transmit and receive the wireless signals from the portable devices 104 and 105. Although network 100 illustrates the portable client computing devices 104 and 105 as coupled to a server computer 102, it should be noted that these devices could be coupled to other communication devices or computers, over network 110.

As is well known to users of such devices, typical cell phones and PDA's do not usually contain a full complement of QWERTY keys in a standard keyboard arrangement, such as that found on a familiar typewriter or desktop computer keyboard. If full keyboard functionality is provided, special keystroke techniques must often be employed to utilize the limited keypads of these devices. A unique network protocol for portable computing devices is described herein to allow separate devices to be coupled together such that their limited keyboards can be combined to form a full QWERTY keyboard that allows familiar typing techniques to be used without requiring special key stroke sequences.

In one embodiment of the present invention, the mobile phone 104 and PDA device 105 feature modified keypads that allow them to be used in conjunction with each other to form a full QWERTY keyboard. Each device contains a partial set of full keyboard keys. The mobile phone contains an array of keys that contains the usual layout of numerals in the familiar 4-by-3, twelve-key telephone pad matrix. Each key also serves as a letter key to form part of a full keyboard. Likewise, the PDA 105 contains a partial set of QWERTY keys. When used together, the mobile phone and PDA each create a full QWERTY keyboard.

Figure 2A:
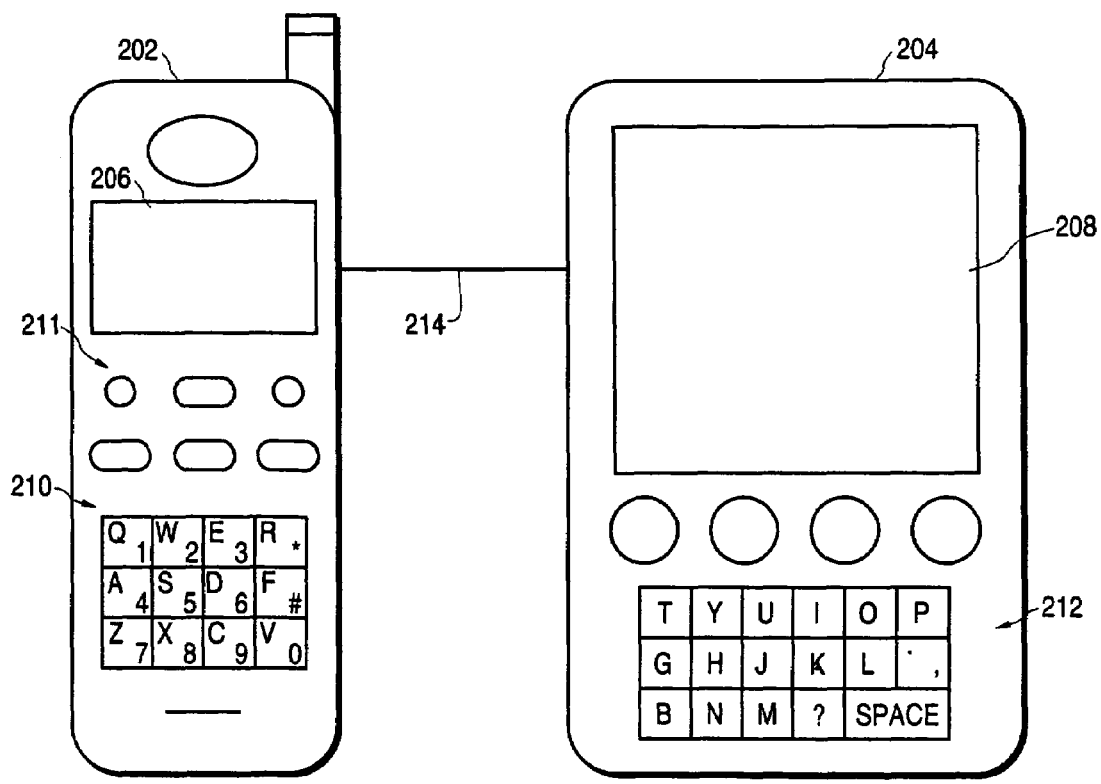
FIG. 2A illustrates a two-portion personal device keyboard coupled together over a hard-wired link, according to one embodiment of the present invention.

FIG. 2A illustrates the combination of a mobile phone and PDA device that are coupled together to form a full QWERTY keyboard, according to one embodiment of the present invention. Mobile phone 202 contains a display area 206, which is typically a Liquid Crystal Display (LCD) screen measuring approximately 1 inch by 1.5 inches. Various function keys 211 are also included to control various operational functions associated with the cell phone. Mobile phone 202 also includes a keypad area 210. In one embodiment of the present invention, the keys are arranged in a matrix of four keys wide by three keys high. Ten of the keys are used for numerals 0-9 and letters (which can be formed by multiple keystrokes), as on a standard telephone keypad. The remaining two keys are used for the * and # buttons, as on a standard 12-key telephone keypad. A partial keyboard map is loaded into the memory of the mobile phone 202 to allow these keys to also be used to input certain letters. In one embodiment, the keys on mobile phone 202 are assigned to the letters on the left-hand side of a standard QWERTY keyboard. Alternatively, the keys can be assigned to the letters on the right-hand side of a standard keyboard.

In FIG. 2A, PDA 204 contains a display area 208, which is typically an LCD screen measuring approximately 2 inches by 2 inches. Various function keys can also included to control various operational functions associated with the PDA. PDA 204 also includes a keypad area 212. The keys are usually arranged in a matrix of six keys wide by three keys high. In one embodiment, a partial keyboard map is loaded into the memory of the PDA device 204. The PDA partial keyboard map is a complement to the partial keyboard map loaded into the memory of the mobile phone 202. The PDA partial keyboard map reassigns the keys on PDA 204 to be assigned to the letters on the complementary side of the standard QWERTY keyboard, to the letters that are assigned to the keyboard of the phone 104. Thus, if the phone 202 is assigned the left side keys, the PDA 204 is assigned the right side keys, and vice-versa. The mobile phone 202 and PDA 204 are coupled together over a link 214. This link allows the two devices to be used in together as an input and communication device. When used together, the separate keypads 210 and 212 and their respective partial keyboard maps combine to form a full QWERTY keyboard. For example, for the top row of the keyboard, the keys QWER are provided by the cell phone 202 and the remaining keys TYUIOP are provided by the PDA 204.

Figure 2B:
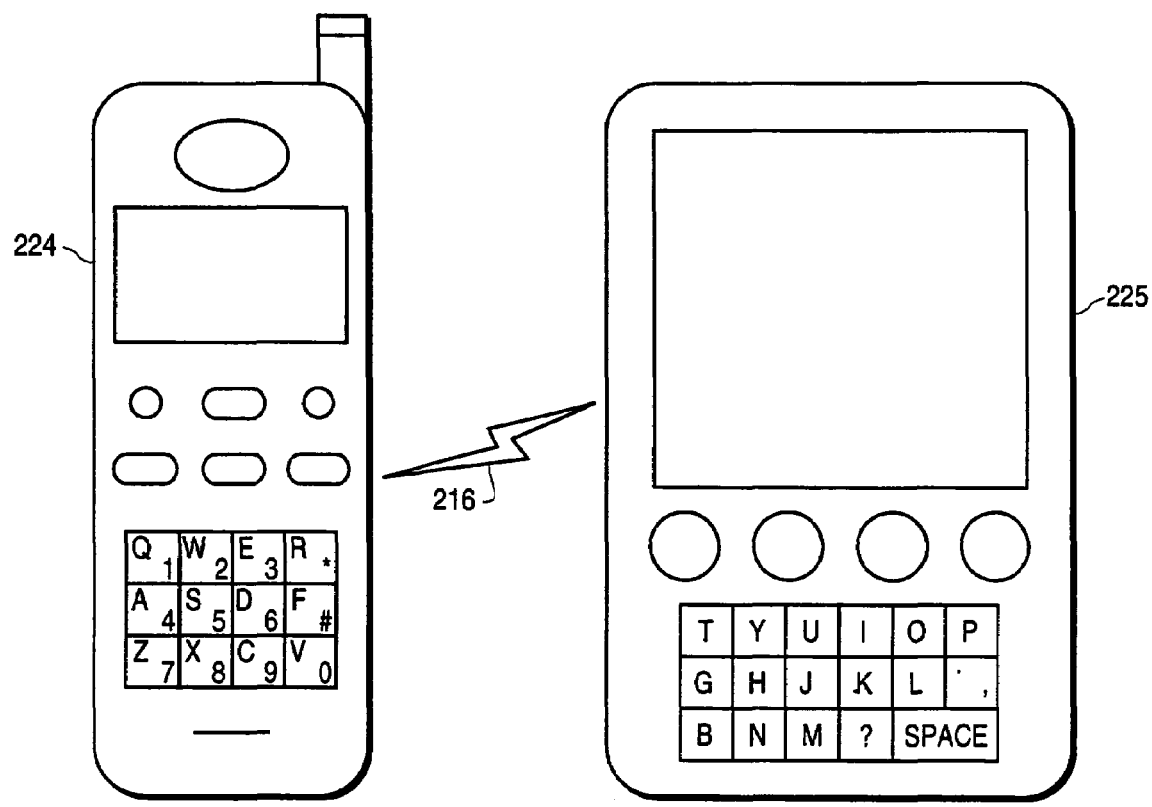
FIG. 2B illustrates a two-portion personal device keyboard coupled together over a wireless link, according to a preferred embodiment of the present invention.

Instead of a physical link between the devices, as illustrated in FIG. 2A, a wireless link may be employed to facilitate maximum flexibility and placement of the devices. FIG. 2B illustrates a preferred embodiment of the present invention in which the mobile phone 224 and PDA 225 are coupled together over a wireless link 216.

Various different key layouts are possible for the separation of the keys between the cell phone and PDA devices. FIG. 3A illustrates the layout of the left and right side keypads, according to one embodiment of the present invention. For the embodiment illustrated in FIG. 3A, the keypad 302 for the mobile phone comprises an array of twelve keys arranged in a matrix of three rows of four keys each. The top row consists of the keys for the letters Q-W-E-R, the second row consists of keys for the letters A-S-D-F, and the lowest row consists of keys for the letters Z-X-C-V. The keys in keypad 302 also serve as numerals and symbol keys, as shown in FIG. 3A. When the mobile phone 104 is coupled to PDA 105 in a network, as shown in FIG. 1, a keyboard mapping function switches the key input functions from normal phone use, i.e., numerals and letters by multiple keystrokes, to keyboard use, i.e., letters through single keystrokes, as on a standard desktop keyboard. For example, in the network setting, the key for the numeral "5" types the letter "S" instead.

Keypad 304 of FIG. 3A illustrates the layout of the matching PDA device, according to one embodiment of the present invention. Keypad 304 for the PDA comprises an array of 17 keys arranged in a matrix of three rows of five or six keys each. The top row consists of the keys for the letters T-Y-U-I-O-P, the second row consists of keys for the letters G-H-J-K-L, and the lowest row consists of keys for the letters B-N-M. One key is assigned to be a space key. Various symbols, such as a period, comma, question mark, and so on, can be assigned to the remaining keys, as illustrated in FIG. 3A, or as alternate key assignments for the letter keys. A function key on the PDA can be used to select between the letter and any secondary symbol assigned to each particular key.

As can be seen in FIG. 3A, when the two keypads 302 and 304 are aligned next to one another such that the top row of keypad 302 lines up with the top row of keypad 304, a full conventional QWERTY keyboard, for at least the alphabetical portion, is provided to the user. FIG. 3A is intended to illustrate one possible layout of the keys within the keypads 302 and 304. It should be noted that other layouts are possible according to alternative embodiments of the present invention. For example, the keyboard that is to be mapped and provided by the compound keypads could correspond to a portion of the 105-key U.S. standard keyboard, or any other type of keyboard.

The size of the keys on a standard keyboard is typically about one-half inch square. The size of the keys on a typical mobile phones and PDA devices are usually much smaller and vary considerably from device to device. In one embodiment of the present invention, the keys in the phone keypad 210 and PDA keypad 212 are designed to be approximately ⅜ inch square each. Depending upon the size of the phone and PDA packages, a small degree of gap between the keys may be provided. Alternatively, no gap may be provided between the keys, as illustrated in the keypads of FIG. 3A. The size of the keys is set such that quick typing is facilitated, while conforming to the size constraints and form factors of the devices. Alternatively, for applications in which fast typing is not as important as maintaining minimal package sizes and weight, the keys within keypads 302 and 304 can be made as small as those presently found on such devices, that is, approximately ¼ inch square.

In one embodiment of the present invention, the keys within keypad 302 and keypad 304 are all approximately equal in size. In an alternative embodiment, certain of the keys may be made smaller to facilitate their inclusion in the device. For example, for keypad 302, the keys on the outer sides may be made narrower since they do not border other keys on one side. Thus, for example in FIG. 3A, the keys R, F, and V on the right hand side of keypad 3A may be made more narrow then the remaining keys. To facilitate accurate hitting of these keys, they may be raised slightly and/or angled toward the center of the keypad.

Figure 3B:
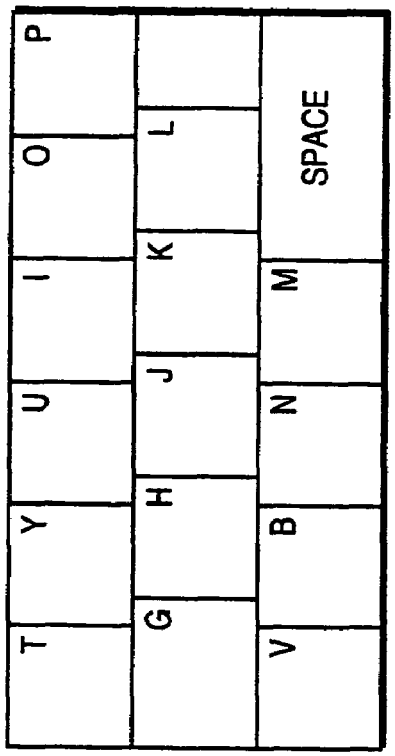
FIG. 3B illustrates the layout of a dual portion keyboard, according to a first alternative embodiment of the present invention.
Figure 3B:
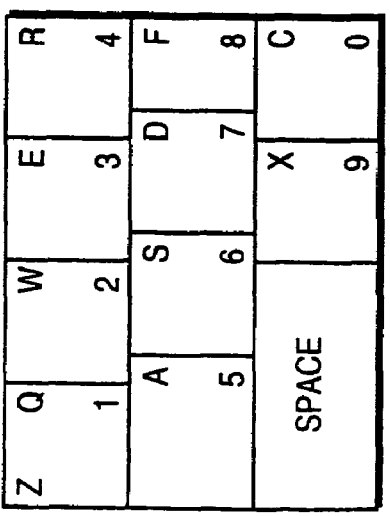

FIG. 3B illustrates the layout of the phone and PDA keypads according to an alternative embodiment of the present invention. As illustrated in FIG. 3B, the key assignments are different, as are the relative sizes of the keys. For the keyboard layout of FIG. 3B, the keypad 306 for the mobile phone features keys that are of different sizes and position. In addition, certain letters are not assigned to their own keys, but are instead formed by typing certain combinations of other keys. For example, the letter Z, which is a relatively rarely used letter, is formed by typing the letter Q twice. Since the pattern "QQ" does not normally appear in any words that are normally typed, this type of coding is suitable for generating an alternate character. Other such double tapping techniques can be used to code other letters or symbols to extend the range of characters. The use of this coding technique allows a reduction of the number of keys used in the keypad, and an enlargement of the size of the remaining keys within the form factor size of the mobile phone and PDA devices.

The configuration of keypads 306 and 308 in FIG. 3B is intended to be illustrative of the key layout for the mobile phone and PDA devices, and it should be noted that several other layouts are possible within the scope of embodiments of the present invention. For example, FIG. 3C illustrates the layout of a dual portion keyboard, according to a further alternative embodiment of the present invention. For the keyboard layout illustrated in FIG. 3C, the mobile phone keypad 310 comprises an alpha-numeric keypad of letters and numerals similar to that found on a standard telephone keypad, along with certain symbol keys that can be accessed by utilizing a shift key, or pre-defined keystroke sequence. Likewise, the PDA keypad 312 comprises a number of alternate symbols that are accessed through the use a special shift key or keystroke sequence.

To further conform to space constraints imposed by the portable devices, the display portion of the portable devices may be utilized depending upon the configuration of the device. For example, many PDA devices feature relatively large LCD (Liquid Crystal Display) screen areas that can be utilized by the keyboard maps of the device. For devices that feature touch-screen functionality, the display, or a portion of the display may be referred to as the "graffiti area". This refers to the area of the screen that recognizes the input caused by a stylus or similar device to accept handwritten input or contact on the display.

Figure 3D:
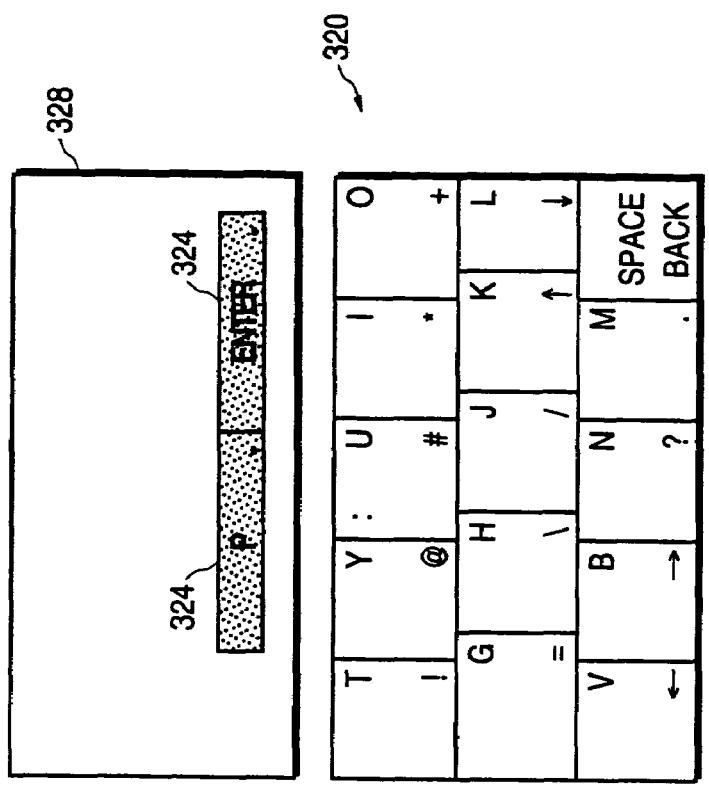
FIG. 3D illustrates a keyboard layout for a device that utilizes a portion of the display area to implement certain keys as touchscreen keys, according to a third alternative embodiment of the present invention.
Figure 3D:
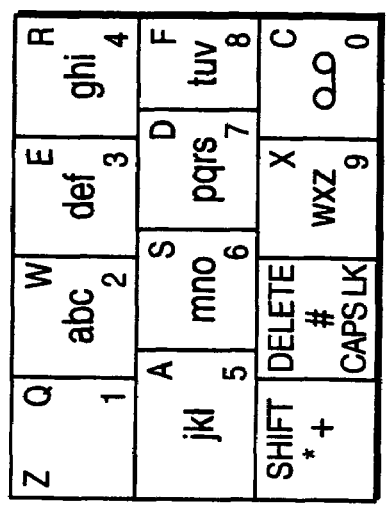

FIG. 3D illustrates a keyboard layout for a PDA device that utilizes a portion of the display area to implement certain keys as touchscreen keys. For this embodiment, the PDA keypad 320 includes a reduced number of keys. For example, the "P" and "Enter" keys are not present as physical keys within the keypad 322. Instead they are embodied as touchscreen keys 324 in a portion of the display screen of the device. It should be noted that any number of keys can be so coded, depending upon the available space available within the display area. For the embodiment illustrated in FIG. 3D, the display area 328 comprises a multi-purpose screen. It can function as an output display, a graffiti area for touch-sensitive applications, or a virtual keyboard portion when the device is used as a partial keyboard in conjunction with embodiments of the present invention.

Figure 5:
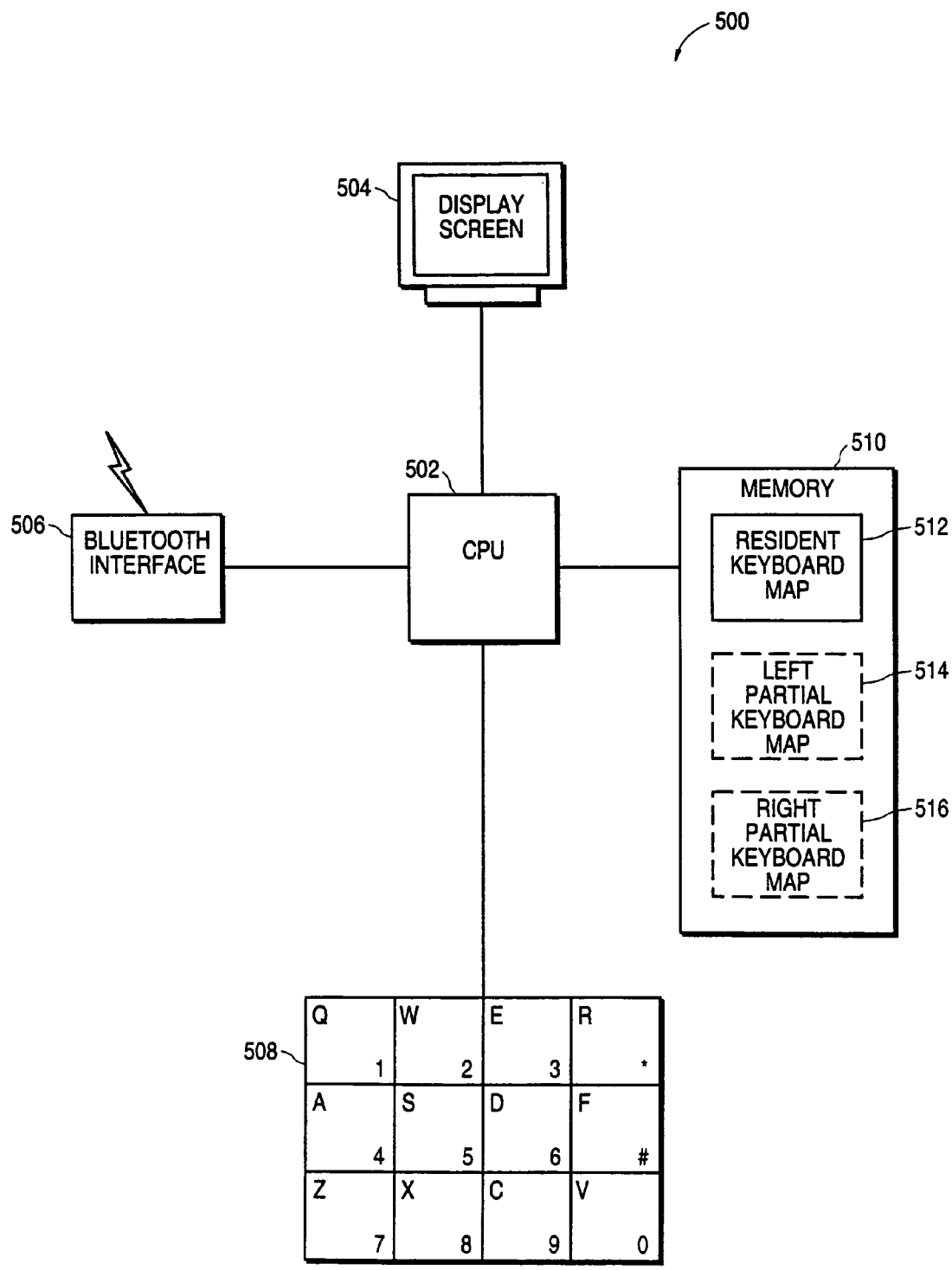
FIG. 5 is a block diagram illustrating the main functional components of a dual portion keyboard device, according to one embodiment of the present invention.

FIG. 5 is a block diagram illustrating the main functional components of a dual portion keyboard device, according to one embodiment of the present invention. System 500 is intended to illustrate the main components within either the PDA device 225, or the mobile phone device 224 of FIG. 2B. The central processing unit (CPU) 205 of the device is coupled to a display screen 504, and a keyboard 508. As illustrated in FIG. 5, the keyboard 508 corresponds to the modified cell phone keyboard 302 illustrated in FIG. 3A. A wireless interface 506 coupled to CPU 502 provides network access to the second portable device to form a system such as that illustrated in FIG. 2B. In one embodiment, the wireless interface used is a Bluetooth interface.

The CPU 502 is also coupled to an on-board memory 510. The memory stores various programs and data objects that control the operation of the portable device. One object that is stored in the memory of the device is a resident keyboard map 512 that maps the keys on keypad 508 to the appropriate letters and numerals for the device. Thus, in the case that system 500 represents a cell phone, the keyboard map represents the standard keyboard map for a telephone keypad. In one embodiment of the present invention, the memory 510 also stores one or more partial keyboard maps 514 and 516. The partial keyboard maps reassign the keypad 508 keys to correspond to the portion of the QWERTY keyboard contained in the device when it is used in a compound portable device system, such as that illustrated in FIG. 2B. If the device is a left-side device, such as cell phone 224 in FIG. 2B, the left partial keyboard map 514 is loaded into the memory 510. Similarly, if the device is a right-side device, such as PDA 225 in FIG. 2B, the right partial keyboard map 516 is loaded into memory 510. Thus, for the system illustrated in FIG. 5, if keypad 508 consists of the left-side keys, as shown, then the left partial keyboard map 514 would be loaded into memory. Upon activation of the device in the compound device network, the partial keyboard map 514 overrides the resident keyboard map 512 to map the keys 508 to the output.

In one embodiment, the appropriate partial keyboard map 514 or 516 is pre-loaded into the memory 510 of the device depending upon its use as either a left or right side keyboard device. This restricts the operation of the device to function as either a left or right side device in all compound device networks. In an alternative embodiment both the left and right partial keyboard maps 514 and 516, or a full keyboard map combining the two, are loaded into the memory 510 of the device. This allows the function of the device to be defined upon installation within a compound device network.

As shown in FIG. 5, the keypads for the mobile phone and PDA devices of FIGS. 2A and 2B each access a partial keyboard map 514 or 516, as well as their own resident keyboard map 512. The partial keyboard maps allow the two independent keypads to operate in conjunction with one another to form a full keyboard. For the embodiment of the present invention illustrated in FIG. 2A, the mobile phone 104 and PDA 105 are coupled to one another through a physical link 214. Physical link 214 may be a flexible electrical cable of varying and adjustable length. The keypads 210 and 212 together form the input keyboard of the integrated device. The typed output may be displayed on either display 208 of the PDA, or display 206 of the phone, or it may be displayed on both displays together.

As stated above, FIG. 2B illustrates a preferred embodiment of the present invention in which the mobile phone 224 and PDA 225 are coupled together over a wireless link 216. For the embodiment of FIG. 2B, both devices implement a wireless protocol that allows them to synchronize their operation and access common data and produce common output. The wireless link can be implemented using a number of different protocols, including WiFi, ultrawideband (UWB), near field communications (NFC), and Zigbee, all of which are IEEE wireless standards.

In one embodiment, the wireless protocol is the Bluetooth protocol. Bluetooth is an industry consortium developed technology that defines specifications for small form factor, low-cost, low power consumption, short-range radio links between mobile personal computers, mobile phones and other portable devices. The Bluetooth core specification defines a protocol stack that includes a baseband and Link Manager Protocol that reside over a radio layer. The radio layer operates in a band extending from 2400 to 2483.5 MHz and uses spread spectrum communication. The baseband layer controls the radio and performs packet handling over the wireless link. Under the Bluetooth protocol, two types of links can be established, Synchronous Connection Oriented (SCO), and Asynchronous Connection Less (ACL). SCO links are used for synchronous data, such as voice data, while ACL links are for data transfer applications that do not require a synchronous link. The Link Manager Protocol performs network management functions, such as establishing ACL/SCO links, attaching/detaching slave devices, setting link parameters (power, quality, security, etc.), and other similar functions.

For the embodiment of the invention illustrated in FIG. 2B, the mobile phone and PDA devices are both Bluetooth enabled devices that are configured to form a piconet. In a Bluetooth system, a piconet is a group of devices connected to form a common channel, which is identified with a unique frequency hop sequence. One of the devices, either the mobile phone 224 or the PDA 225 is the master, while the other device is the slave. Bluetooth devices use a frequency hopping mechanism fixed at 2402+k MHz, where k=0,1, . . . ,78. The nominal hop rate is 1600 hops per second, which yields a single hop slot of 625 microseconds. Each device has an internal system clock which determines the timing and hopping of the transceiver. The timing and frequency hopping on the channel of a piconet is determined by the clock of the master. When the piconet is established, the master clock is communicated to the slaves.

In one embodiment of the present invention, the device that includes the left-hand side keys is configured to be the Bluetooth slave device, and the device that includes the right hand side keys, e.g., keypad 304 in FIG. 3A, is the Bluetooth master device. The two devices follow the standard Bluetooth procedures to establish a connection between them. Upon being placed in proximity with the other device, either the PDA or mobile phone automatically initiates an inquiry to find out what access points are within its range. If the other device is within range, it will respond with its address. The initiating device will then start a paging procedure in which the clock offset, frequency hop, and other initialization parameters are synchronized between the two devices. If a security mode is used to restrict access to one or both of the devices, the access point device will send a security request for pairing. This requires that the user input a proper identifier code to access the service.

Once a link is established, the Link Manager Protocol within the initiating device utilizes a Service Discovery Protocol to determine what services are available from the access point device. In one embodiment of the present invention, the dual portion keyboard map is available as a service that is identifiable by the Service Discovery Protocol. This service allows the partial keyboard map to be loaded into active memory of the devices, and the input keystrokes to access corresponding keys within the keyboard map.

Corresponding to the embodiment illustrated in FIG. 5, each of the mobile phone 224 and PDA 225 devices in the piconet illustrated in FIG. 2B stores a resident keyboard map 512 in memory 510, as well as a partial keyboard map 514 or 516. The partial keyboard map corresponds to the portion of a full QWERTY keyboard that the device contains. Upon establishment of the piconet, the keys within the partial keyboard map corresponding to the portion of the keyboard included in the device are enabled. Thus, for example, the mobile phone 224 stores the byte codes for a full QWERTY keyboard in its resident keyboard map 512. However, when the phone is used in a piconet with PDA 225, only the keys corresponding to its portion of the keyboard, e.g., keypad 302 (the left-hand side keys, QWER ASDF ZXCV) in FIG. 3A are enabled through the use of the left partial keyboard map 514.

The default mode for each of the devices in the compound device network of FIG. 2B, is with their respective resident keyboard maps enabled. This allows them to operate as normal cell phone or PDA devices. The partial keyboard mode for each device can be activated in two or more different methods upon establishment of a compound data entry network containing the two devices. In one embodiment, the devices can include a hardware switch that can activate the appropriate partial keyboard map. Such a switch can be a separate button included on the device, or it may be embodied within an existing key on the keypad. The devices may be configured such that each device is activated individually through its own switch. Alternatively the device may be configured such that once a network between two devices is established, the activation of a partial keyboard map in one device serves to activate both networked devices.

In an alternative embodiment, for devices that are coupled through a Bluetooth or similar network link, the activation of the partial keyboard map within a device can be accomplished by sensing a pre-assigned Bluetooth signal from one device to the other device. For non-Bluetooth networked devices, an interrogation (or similar type) signal can be used to activate the partial keyboard maps within the devices.

Once a device has been activated to operate in the partial keyboard mode, the resident keyboard map is deactivated. At this point, the ASCII, or other digital coded output generated by the keypad keys is dictated by the key assignments contained in the appropriate partial keyboard map. Reactivation of the resident keyboard map occurs when the device is no longer used in the compound device network. In one embodiment, the partial keyboard map is deactivated through a hardwire switch, as described above. Alternatively, the devices may be programmed to revert automatically to the resident keyboard operation upon non-use for a certain period of time, or through a particular software command transmitted between the devices.

Figure 4A:
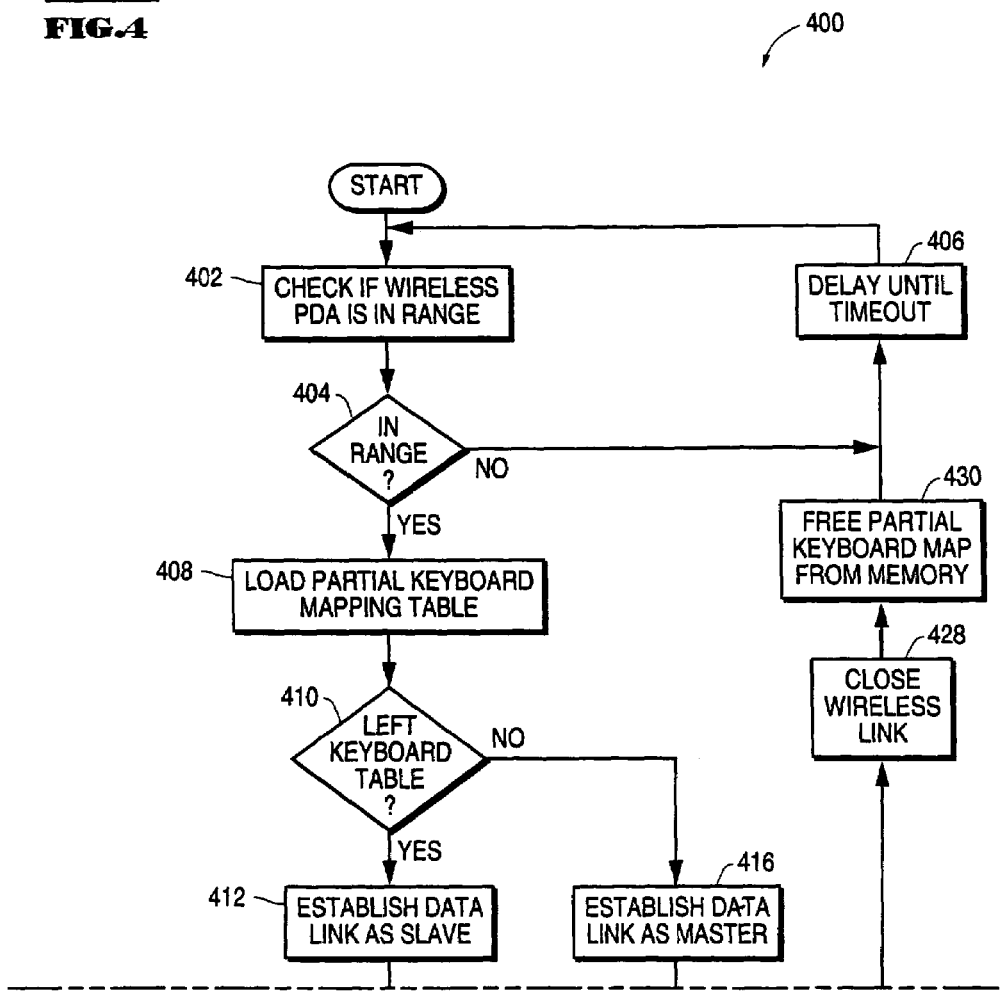
FIG. 4 is a flowchart that illustrates the process of interfacing and processing user input data using a dual portion keyboard, according to a method of the present invention.
Figure 4B:
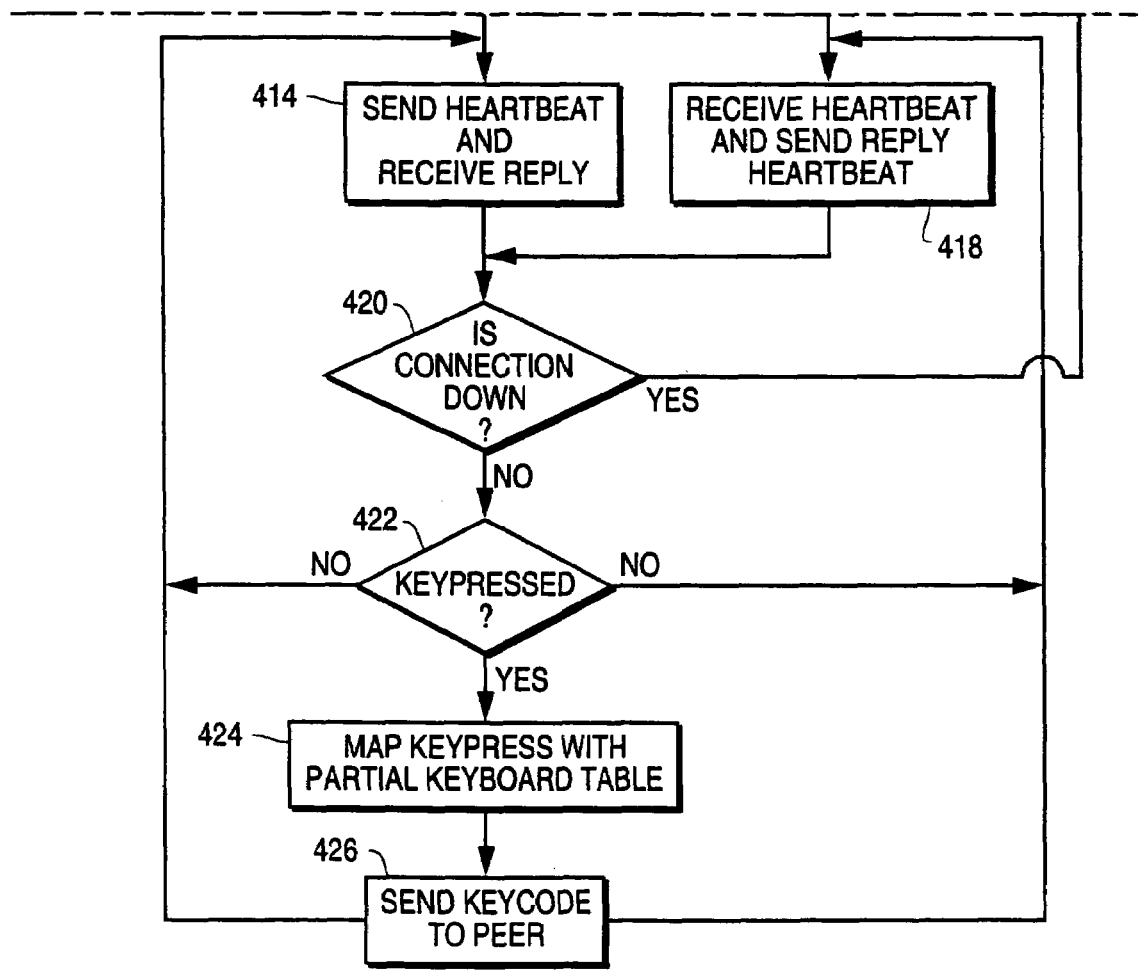

FIG. 4 is a flowchart that illustrates the steps in establishing a compound keyboard link using two portable computing devices, according to a method of the present invention. The process begins with one device, the initiating device (e.g., cell phone 224), being placed within proximity of the second device, the access point (e.g., PDA 225). In step 402 the initiating device checks if the wireless access point device is in range. If no responding device is within range, as determined in step 404, the initiating device continues to check until it times out, step 406.

If a responding access point device is within range, a Bluetooth piconet between the two devices is formed, and the appropriate (left or right) partial keyboard mapping table is loaded into the memory of the initiating and access point devices, step 408. In this step, the resident keyboard map is disabled or otherwise overwritten. In step 410, it is determined whether the initiating device uses the left portion of the keyboard table, i.e., keys QWER ASDF, and so on. If it does use the left partial keyboard table, the initiating device establishes the data link with the access point as a slave device, step 412. In this case, the access point device is the master. If the initiating device uses the right partial keyboard table, however, it establishes the data link as a master device, in which case the access point is the slave device, step 416. It should be noted that the assignment of the left keyboard device as the slave and the right keyboard device as the master is arbitrary. Therefore, in an alternative embodiment, the left keyboard device could be the master and the right keyboard device could be the slave.

If the initiating device is a slave device, it sends a heartbeat signal to the master, and receives a reply, step 414. If, on the other hand, the initiating device is a master, it waits to receive a heartbeat signal from the slave access point device, and then sends a reply heartbeat signal, step 418. The heartbeat signal serves to maintain the Bluetooth network connection between the two devices.

In step 420 it is determined whether the connection between the two devices is down. The connection can be terminated through a variety of conditions, such as a device being placed out of range of the other device, inactivity for an extended period of time, or an explicit disconnect command from the user. If it is determined that the connection is down, the wireless link is closed, step 428, and the partial keyboard map is freed from the memory of the initiating and access point devices, step 430. At this point, the resident keyboard map is reloaded or reactivated so that normal device operation can be resumed.

While the connection is maintained, the system determines if a key on either of the master or slave devices has been pressed, step 422. If no key input is detected, the connection is maintained through the use of the periodic heartbeat signals between the two devices. An optional timeout routine can impose an absolute time limit on the period of inactivity and cause the connection to terminate.

If a keystroke on either the master or slave device is detected, the key pressed is mapped to the partial keyboard table in the memory of the respective device. The letter, number or symbol corresponding to the pressed key is then sent to a display device, such as on one or both of the devices, or it may be sent to a separate computer, such as server computer 102 in FIG. 1. The keycode is also sent to the other device of the piconet, referred to as the "peer" device, step 426. This enables both the master and slave devices to be aware of the full text being keyed in for orderly running of applications on either device. The procedure continues until it is determined that the Bluetooth connection between the two devices is terminated.

Although FIG. 2B illustrates an embodiment in which the wireless interface between the two portable devices is a Bluetooth link, other embodiments can implement different wireless links, such as infrared communication, cell-based communication, and the like.

It should be noted that although the description above addressed embodiments in which the devices in the piconet comprise a mobile phone and a PDA device, any combination of portable devices can be configured and used to implement the compound keyboard of the present invention. For example, two PDA devices, or a PDA and other type of portable computing device may be configured and combined to provide a full keyboard. In addition, one or both of the portable devices can be any other type of mobile device, such as a mobile phone, smartphone, personal media player (e.g., Apple® iPod™ or Creative Technology® Zen™), handheld game console (e.g., Sony® Playstation Portable™), ultra personal computer (UPC), notebook computer, or laptop computer.

Similarly, a combination of greater than two portable computing devices may be configured and networked to provide a full keyboard. For example, three mobile phones can be networked in a Bluetooth piconet or scatternet to provide full keyboard functionality. For these alternate embodiments, the partial keyboard maps are defined to correspond to the keys contained in the respective devices.

For the embodiment in which the connection between the mobile phone and PDA is a hardwired link, as shown in FIG. 2A, the operation of the two portable computing devices is similar to that of the wireless embodiment described above. Instead of a wireless protocol, such as Bluetooth, a small-scale or local area network protocol may be used to coordinate data entry and communicate the keyboard entry data between the two devices. A keyboard map is loaded into the memory of both devices, and is used to translate the keystrokes entered into each device's partial keyboard into a common output. For network protocols that require the establishment of slave and master devices, the coordination between the devices can be accomplished as described with reference to the method of FIG. 4. For protocols that do not require a master/slave hierarchy, communication between the two devices can be implemented between the two devices as network peers.

Although the description above addressed embodiments in which the keyboard to be mapped and provided by the compound keypads corresponds a standard QWERTY keyboard or a portion of a QWERTY keyboard, it should be noted that many other types of keyboard layouts can be mapped and configured for use in the compound keyboard system. The most common alternative keyboard layout schemes would be those corresponding to different countries or language regions, or keyboards that include additional characters, such as accented characters, or different types of control characters, such as "alt", "shift" or "ctrl" keys.

Figure 6:
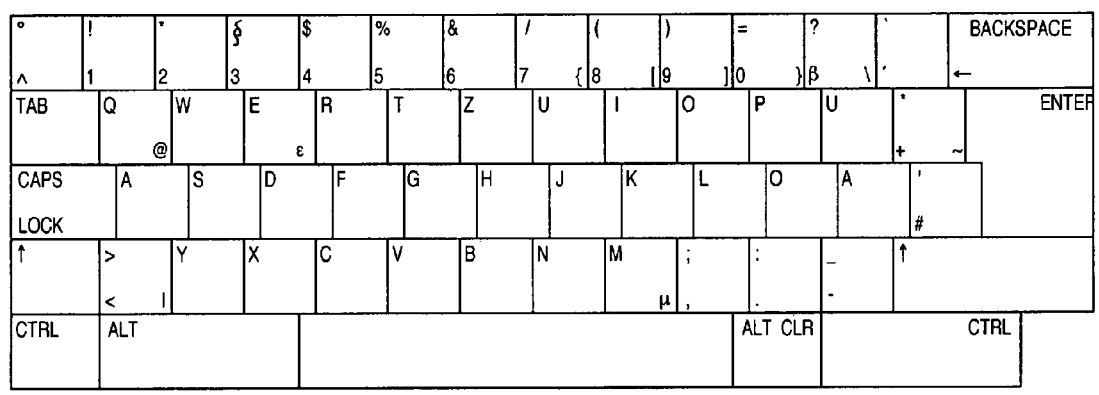
FIG. 6 is an illustration of a keyboard layout according to an alternative embodiment of the present invention.

There are a large number of different keyboard layouts used with different languages written in Roman script. Although most of these layouts are quite similar, there are some notable variances. For example, Germany and much of central Europe uses the "QWERTZ" keyboard layout, which is illustrated in FIG. 6. The main difference between this keyboard and the QWERTY is that Y and Z are swapped. In another example, the "AZERTY" layout is commonly used in France and in some surrounding countries. This keyboard differs from the QWERTY layout by swapping the A and Q keys, swapping the Z and W keys, and moving the M key to the right of the L key. Any of these types of keyboards can be mapped and configured using the compound keyboard system described herein.

Figure 7:
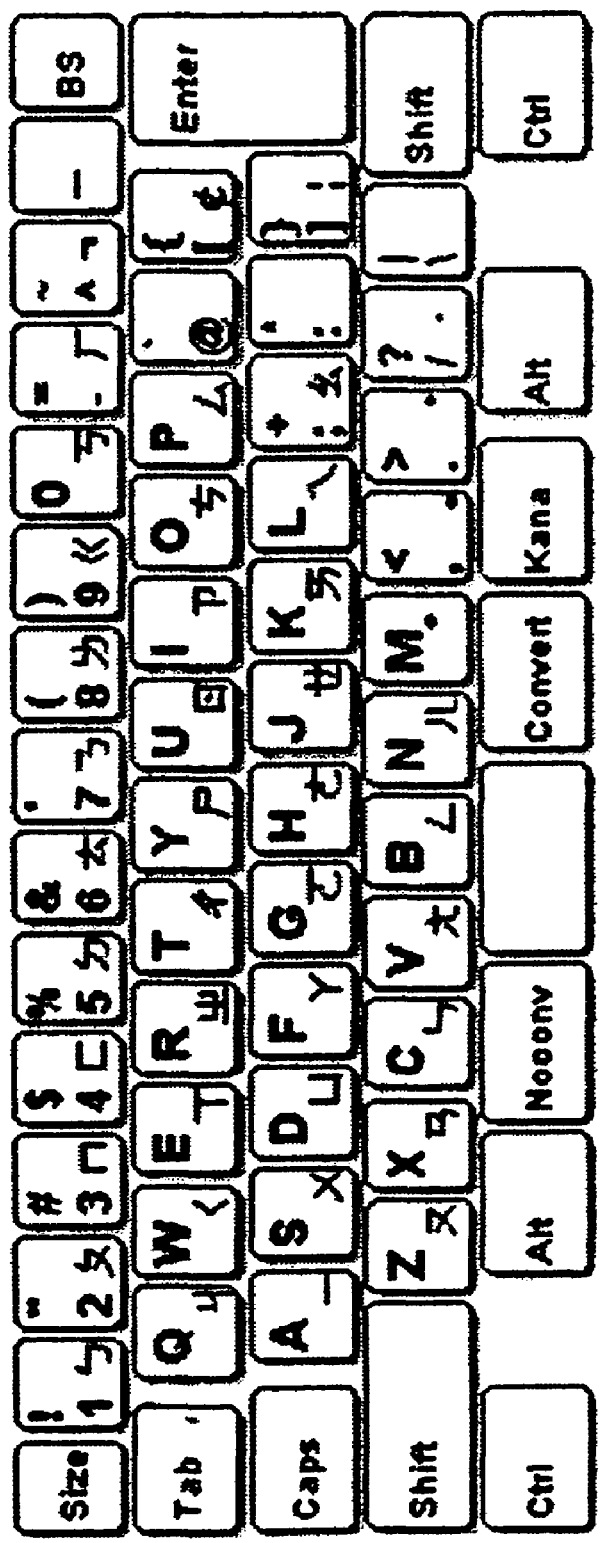
FIG. 7 is an illustration of a keyboard layout according to another alternative embodiment of the present invention.

Some keyboard layouts for non-roman alphabets are based on the QWERTY layout even though the characters that are typed are not roman script. In general, for these keyboards, glyphs are assigned to keys which bear similar sounding or similar appearing glyphs in QWERTY. Examples include Arabic, Greek, Sanskrit, Russian, and Asian language keyboards. Any of these types of keyboards can also be mapped and configured using the compound keyboard system described herein. As an example, FIG. 7 illustrates a keyboard layout for Chinese character entry, that can be mapped using two or more portable devices.

Figure 8:
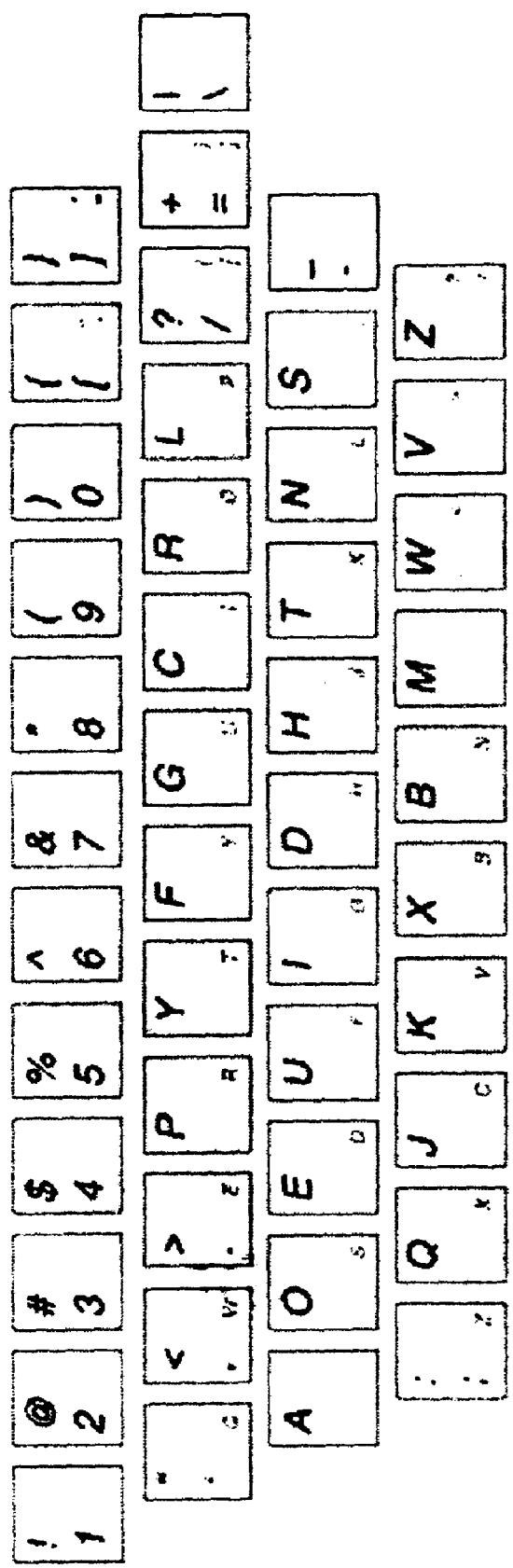
FIG. 8 is an illustration of a keyboard layout according to yet another alternative embodiment of the present invention.

Other alternative types of keyboards have also been developed to facilitate higher typing speeds or accommodate ergonomic considerations. For example, the Dvorak Simplified Keyboard was developed to feature a keyboard layout that is intended to increase typing speeds. FIG. 8 is an example of the Dvorak keyboard layout that can be used in one embodiment of the present invention. For this embodiment, the keyboard layout would be divided into two or more portions, with each portion mapped to a different portable device that contains a subset of the keys comprising the full keyboard.

For any keyboard layout that is to be implemented using compound devices, the base keyboard is divided into separate portions, each of which is mapped to one of the portable devices. Thus, any type of keyboard layout can be divided and mapped as shown in FIG. 3A, which shows the division of a QWERTY keyboard. The portions can be roughly equal, or they can be proportioned depending upon the number of keys in the respective portable devices.

In one embodiment, the mapping table stored in the portable device can include a country or layout code selector that allows the user to select a particular keyboard layout to be mapped on the one or more portable devices. In this manner, a plurality of different keyboard layouts could be programmed into the portable devices, and the user would easily be able to switch among different keyboard layouts. For example, a country code for China could allow the mapping of the Chinese keyboard on the devices, and a country code for the U.S. would allow the keyboard map to be switched to the QWERTY layout. The mapping table could also include a mechanism that allows the user to modify one or more of the keys in the partial keyboard map stored in one or more of the devices to provide a measure of customization of the compound keyboard layout.

In the foregoing, a system has been described for integrating portable computing devices in a close-coupled network to form a compound keyboard. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A computing device comprising:
   a first portable computing device containing a first portion of a keyboard, the first portion of the keyboard operable to function on its own as a fully functioning complete keyboard for the first portable computing device, and a switch to assign a first partial keyboard map to the keys of the first portion of the conventional QWERTY keyboard;
   a separate second portable computing device containing a second portion of a keyboard, the second portion of the keyboard operable to function as a fully functioning complete keyboard for the second portable computing device;
   a transmission link coupling together the first portions and second portions of the keyboard; and
   a logic circuit coupled to at least one of the first portable computing device and the second portable computing device, and operable to adapt the first and second portions of the keyboard to operate together as a compound keyboard for text entry to at least one of the first portable computing device and second portable computing device.

2. The computing device of claim 1 wherein the second portable computing device includes a switch to assign a second partial keyboard map to the keys of the second portion of the conventional QWERTY keyboard.

3. The computing device of claim 2 wherein the first portable computing device includes a touch sensitive display, wherein one or more keys of the first and second partial keyboard maps are displayed on the touch sensitive display.

4. A compound computing device comprising:
   a portable computing device having a first portion of a full-size keyboard that is operable to function as a fully functioning complete keyboard for the portable computing device as a standalone device in a first keyboard mapped configuration, and a logic circuit to assign the first keyboard mapped configuration to the keys of the first portion of the keyboard;
   a mobile phone separably coupled to the first portable computing device, and having a keypad configured to operate as a fully functioning complete keyboard for the mobile phone when it is used as a standalone device, and to operate as a second portion of the full-size keyboard, when the mobile phone is used in conjunction with the first portable computing device;
   a transmission link coupling together the portable computing device and the mobile phone; and
   a logic circuit configuring the first portable computing device to function as a compound device in a second keyboard mapped configuration when used in conjunction with the mobile phone.

5. The compound computing device of claim 4 wherein the portable computing device is one of a mobile phone, a Personal Digital Assistant, game console, personal media player, and a portable computer.

6. The compound computing device of claim 5 wherein the portable computing device and the mobile phone are coupled over a transmission link selected from the group consisting of a wireless link and a physical wired link.

* * * * *